(No Model.)
J. R. WILKINSON.
WEIGHING SCALE.
No. 360,073. Patented Mar. 29, 1887.
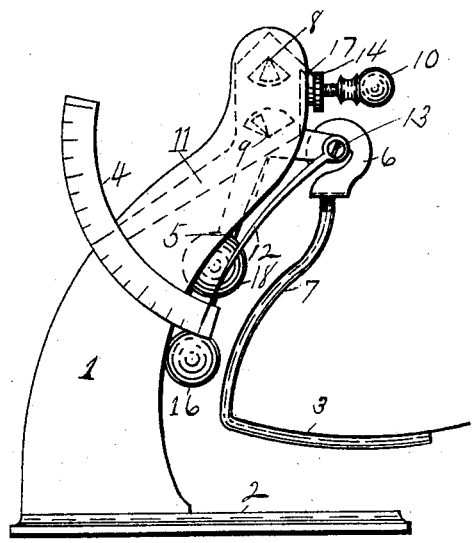
Fig. I.
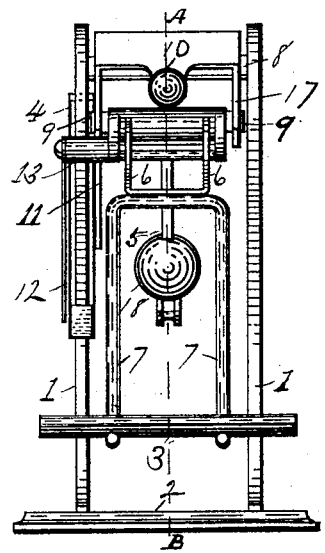
Fig. II.
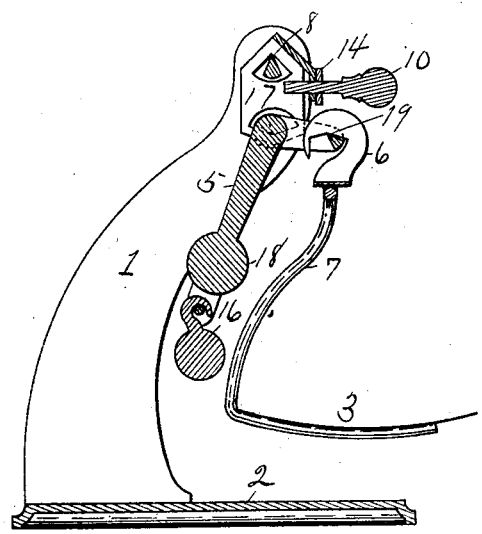
Fig. III.
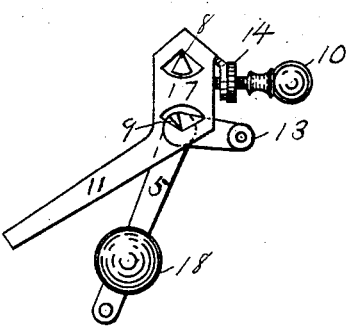
Fig. IV.
Witnesses
A. P. Wood.
Geo. H. Crafts
Inventor
John R. Wilkinson
by Albert A. Wood Att'y

UNITED STATES PATENT OFFICE.

JOHN R. WILKINSON, OF ATLANTA, GEORGIA.

WEIGHING-SCALE.

SPECIFICATION forming part of Letters Patent No. 360,073, dated March 29, 1887.

Application filed August 23, 1886. Serial No. 211,686. (No model.)

*To all whom it may concern:*

Be it known that I, JOHN R. WILKINSON, a citizen of the United States, residing at Atlanta, in the county of Fulton and State of Georgia, have invented a new and useful Weighing-Scale; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to the class of weighing-scales known as "pendulum-scales;" and it consists in details of construction, as hereinafter described and claimed.

In the accompanying drawings, Figure I is a side elevation. Fig. II is a front elevation. Fig. III is a vertical section through the line A B. Fig. IV is a detail showing suspending-stirrup and the beam or pendulum.

Similar reference-marks indicate similar parts in the several figures.

On the base-plate 2 are two arms, 1 1, through the top of which, and connecting them together, is the knife-edged bar 8, on which is suspended the stirrup 17. From this stirrup, on knife-edged bearings 9, is suspended the scale-beam or pendulum 5, having a stationary weight, 18, and a removable weight, 16, on its longer end, and on its shorter end a knife-edged bearing, 19, on which the scale-pan is suspended by means of the hooks 6 6, attached to the arms 7 7. Projecting from the stirrup 17 is an arm, 11, to which is attached a dial, 4, graduated into any number of pounds or fractions thereof. This dial is made in the shape of a loop, as shown in Fig. II, so that when attached to the arm 11, which is situated between the arms 1 1, it will pass around from the inner to the outer side of one of said arms. To the lug 13 is attached a pointer, 12, for the purpose of indicating the weight on the dial 4.

The dial 4 is adjusted in regard to the pointer 12 by changing the center of gravity of the stirrup 17. This is accomplished by means of the counter-balance 10, which is secured to any convenient place on the stirrup opposite the dial-arm 11. This counter-balance is held fast by the lock nut 14. It is obvious that changing the position of the counter-balance changes the center of gravity of the stirrup, thereby causing it to swing back or forth, carrying the dial with it, consequently changing the relative position of the dial to the pointer. There are a series of the supplemental weights 16, multiples of the entire weight indicated by the dial. Each of these weights should balance the whole weight indicated on the dial or some multiple thereof, and the excessive fractions, if any, should be indicated on the dial, the entire weight being indicated by the sum of the weight 16 and the pointer 12 on said dial.

The operation of this device is as follows: The article to be weighed is placed on the pan 3, which will transmit force in proportion to the weight of the article to be weighed, through the arms 7 to the beam 5, which will then rise a distance in proportion to the force applied, and which force will be indicated on the dial 4 by the pointer 12. If the article to be weighed is heavier than (with only the weight 18 as a counter-balance) can be indicated on the dial 4, then a supplemental weight, 16, should be used and all excess over the amount required to balance the weight 16 will be indicated on the dial, and, as hereinbefore stated, the whole weight of the article will be indicated by the weight of the supplemental weight, and the graduations pointed off on the dial.

The proper relative position of the pointer to the dial, if properly adjusted, is insured by the pivoting of the scale on the lower end of the stirrup 17.

Having described my invention, what I claim as new, and desire to secure by Letters Patent of the United States, is as follows:

1. In a pendulum-scale, a frame provided with a knife-edged bearing, 8, a stirrup suspended from said knife-edged bearing 8 and having an arm, 11, carrying a dial, 4, and a counter-balance, 10, the beam 5, and bearings for the pivots of the scale-beam, substantially as shown and described, and for the purpose specified.

2. In a weighing-scale, the combination of the knife-edged bearings 8, the stirrup 17, having an arm, 11, carrying the dial 4, and a counter-balance, 10, the beam 5, having knife-edged bearing 9, and the hooks 6, carrying a scale-pan, 3, arranged substantially as shown and described.

In testimony whereof I affix my signature in presence of two witnesses.

JNO. R. WILKINSON.

Witnesses:
A. P. WOOD,
J. C. HENDRIX.